United States Patent [19]

Barbee et al.

[11] 4,388,456

[45] Jun. 14, 1983

[54] COPOLYESTERS HAVING IMPROVED GAS BARRIER PROPERTIES

[75] Inventors: Robert B. Barbee, Kingsport; Larry A. Minnick, Bluff City, both of Tenn.

[73] Assignee: Eastman Kodak Company, Rochester, N.Y.

[21] Appl. No.: 353,739

[22] Filed: Mar. 1, 1982

[51] Int. Cl.³ .................. C08G 69/44; C08G 73/16
[52] U.S. Cl. ........................ 528/289; 528/184; 528/279; 528/296; 528/302; 528/308
[58] Field of Search ............... 528/289, 184, 296, 302, 528/279

[56] References Cited

U.S. PATENT DOCUMENTS

| | | | |
|---|---|---|---|
| 4,065,439 | 12/1977 | Uno | 528/302 |
| 4,069,209 | 1/1978 | Lange | 528/302 |
| 4,076,693 | 2/1978 | Go | 528/302 |
| 4,098,769 | 7/1978 | Go | 528/194 |
| 4,100,303 | 7/1978 | Go | 426/106 |
| 4,115,363 | 9/1978 | Go | 528/294 |
| 4,145,517 | 3/1979 | Go | 528/294 |

Primary Examiner—Lucille M. Phynes
Attorney, Agent, or Firm—John F. Stevens; Daniel B. Reece, III

[57] ABSTRACT

Disclosed are copolyesters characterized by relatively high glass transition temperatures and low oxygen permeability, the copolyesters being derived from A. 100 mol % of an acid component comprising about 5–75 mol % isophthalic acid and about 95–25 mol % 4-carboxy-N-(carboxymethyl)phthalimide, and B. 100 mol % of a glycol component, at least 80 mol % of said glycol component being ethylene glycol.

10 Claims, No Drawings

COPOLYESTERS HAVING IMPROVED GAS BARRIER PROPERTIES

TECHNICAL FIELD

This invention relates to compositions of matter and articles produced from such compositions, the compositions comprising copolyesters derived in part from 4-carboxy-N-(carboxymethyl)phthalimide which have relatively high glass transition temperatures, and unexpectedly have improved gas barrier properties when in the form of articles such as film or sheet material. The compositions are especially useful in packaging applications where improved barrier properties are required.

BACKGROUND ART

Compositions comprising polymers and certain additives are generally known in the art to have improved resistance to gas permeation. U.S. Pat. No. 4,100,303 discloses copolyesters having low oxygen permeability and high glass transition temperatures. These copolyesters have repeating units as follows:

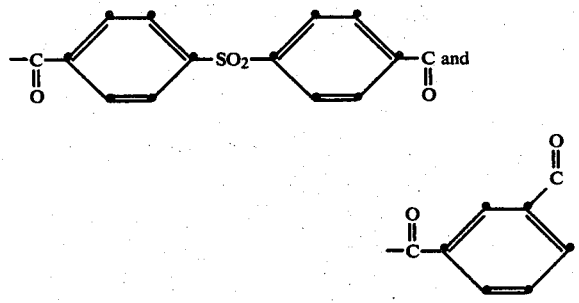

DISCLOSURE OF INVENTION

According to the present invention, amorphous copolyesters characterized by relatively high glass transition temperatures and low oxygen permeability are provided. The copolyesters are derived from A. 100 mol % of an acid component comprising about 5-75 mol % isophthalic acid and about 95-25 mol % 4-carboxy-N-(carboxymethyl)phthalimide, and B. 100 mol % of a glycol component, at least 80 mol % of said glycol component being ethylene glycol.

The compositions are readily formed into film or sheet material especially useful as a packaging material. Relatively high glass transition temperatures are required in filling containers with hot substances such as food to prevent the heat from causing distortion or sagging of the container. The glass transition temperature should at least be higher than 70° C., preferably higher than about 80° C.

In general, up to about 20 mol % of the glycol component can be aliphatic or aromatic glycols such as ethylene glycol; propylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl,6-hexanediol, 1,2-cyclohexanedimethanol; 1,3-cyclohexanedimethanol; 1,4-cyclohexanedimethanol; 2,2,4,4-tetramethyl-1,3-cyclobutanediol; o-, m-, and p-xylylene diols; 4,4'-sulfonyldiphenyl; 4,4'-oxydiphenol; 4,4'-isopropylidenediphenol; and 2,5'-naphthalenediol.

The compositions are copolyesters of poly(ethylene isophthalate) modified with from 25 to 95 mol % (preferably about 30-80 mol %) of 4-carboxy-N(carboxymethyl)phthalimide which has the following structure:

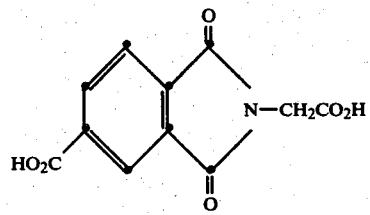

The copolyesters can be prepared by the usual condensation processes and catalysts and have I.V.'s from about 0.5 to 1.0. The phthalimide is prepared by the reaction of glycine with trimellitic anhydride. A specific example of the preparation of the phthalimide is as follows: 4-Carboxy-N-(carboxymethyl)phthalimide is prepared by stirring with heating at 220° C. for one hour 192.13 grams of trimellitic anhydride in 600 ml. of phenyl ether to convert any acid to anhydride. The solution is cooled to 140° C. and 75.07 grams of glycine is added over a period of 45 minutes with rapid stirring. The reaction mixture is heated one hour at 170° C. then one hour at 225° C. The reaction mixture is cooled and filtered to give 240 grams of product which is then recrystallized twice from water using decolorizing charcoal to give 174 grams of product with melting point of 267°-269° C. by Fischer-Johns melting point apparatus. If desired, conventional additives such as dyes, pigments, stabilizers, plasticizers, fillers, etc., may be added to the compositions in the usual amounts.

Film or sheet material made from the compositions of the present invention is strong and clear. It may be formed into articles such as wrappers, bags, bottles, and the like. Such articles are found to have improved gas barrier properties as determined by oxygen permeability properties, and are especially useful in the packaging of food.

The following examples are submitted for a better understanding of the invention.

In the examples, oxygen permeability is determined in cubic centimeters permeating a 1 mil thick sample, 100 inches square, for a 24-hour period under oxygen partial pressure difference of one atmosphere at 30° C. using a MOCON Oxtran 100 instrument. The film actually used to measure oxygen permeability is frequently 3-8 mils in thickness, but the permeability is readily converted to a one mil basis using conventional calculations. The glass transition temperatures are determined in °C. with a Perkin-Elmer DSC-2 differential scanning calorimeter.

The polyesters in the following examples are either extruded or pressed into 5-10 mil film and oxygen permeability and glass transition temperature (Tg) determined. Table 1 shows that concentrations of phthalimide greater than 25 mol % increase the glass transition of poly(ethylene isophthalate) to a value greater than that of poly(ethylene terephthalate) and that the oxygen permeability is much less than that of poly(ethylene terephthalate). Table 2 shows that, as the number of methylene groups attached to the nitrogen in the phthalimide increases, the glass transition temperature is reduced.

EXAMPLE 1

Poly(ethylene isophthalate) modified with 25 mol % of 4-carboxy-N-(carboxymethyl)phthalimide is prepared by stirring with heating 123.73 grams of dimethyl isophthalate, 52.12 grams of 4-carboxy-N(carboxymethyl)phthalimide, 105.02 grams of ethylene glycol, and 100 parts per million of titanium from titanium tetraisopropoxide. The reaction is kept under nitrogen at 200° C. for 90 minutes, and then the temperature is increased to 210° C. for 90 minutes while the methanol distills and the phthalimide reacts. The temperature is raised to 260° C., the nitrogen is removed, and a vacuum is applied to the reaction for 60 minutes to remove excess glycol. The melt condensation is continued at 275° C. for 45 minutes under 0.5 millimeters of mercury pressure. The heat is removed and the reaction mixture is let down to atmospheric pressure with nitrogen. The final polymer has an inherent viscosity of 0.89.

EXAMPLE 2

The procedure described for Example 1 is repeated except 55 mol % 4-carboxy-N-(carboxymethyl)phthalimide is used. The resulting polymer has an I.V. of 0.94.

EXAMPLE 3

The procedure described for Example 1 is repeated except 78 mol % 4-carboxy-N-(carboxymethyl)phthalimide is used. The resulting polymer has an I.V. of 0.81.

EXAMPLE 4 (Control)

The procedure described for Example 1 is repeated except 53 mol % 4-carboxy-N-(carboxyethyl)phthalimide is used. The resulting polymer has an I.V. of 0.59.

EXAMPLE 5 (Control)

The procedure described for Example 1 is repeated except 48 mol % of 4-carboxy-N-(carboxypentyl)phthalimide is used. The resulting polymer has an I.V. of 0.93.

TABLE 1

| Example | Mol % Phthalimide | Tg, °C. | $O_2$ Permeability[1] |
| --- | --- | --- | --- |
| 1 | 25 | 73 | 2.6 |
| 2 | 55 | 91 | 1.3 |
| 3 | 78 | 97 | 2.1 |
| Poly(ethylene terephthalate) (Control) | 0 | 75 | 10.0 |
| Poly(ethylene isophthalate) (Control) | 0 | 65 | 3.0 |

[1] cc mil/100 in$^2$ · 24 hr · atm

TABLE 2

| Example | Phthalimide | Mol %[1] | Tg °C. | $O_2$ Permeability[2] |
| --- | --- | --- | --- | --- |
| 2 | 4-carboxy-N—(carboxymethyl) phthalimide | 55 | 91 | 1.3 |
| 4 (Control) | 4-carboxy-N—(carboxyethyl) phthalimide | 53 | 68 | 1.8 |
| 5 (Control) | 4-carboxy-N—(carboxypentyl) phthalimide | 48 | 49 | 2.5 |

[1] Represents 50 wt. % in each example.
[2] Oxygen permeability in cc mil/100 in$^2$ · 24 hr · atm.

All inherent viscosities are determined at 25° C. in a (60/40 by weight) mixture of phenol/tetrachloroethane at a concentration of 0.5 g/100 ml.

Unless otherwise specified, all parts, ratios, percentages, etc., are by weight.

The invention has been described in detail with particular reference to preferred embodiments thereof, but it will be understood that variations and modifications can be effected within the spirit and scope of the invention.

We claim:

1. Copolyesters characterized by relatively high glass transition temperatures and low oxygen permeability, said copolyesters being derived from
   A. 100 mol % of an acid component comprising about 5–75 mol % isophthalic acid and about 95–25 mol % 4-carboxy-N-(carboxymethyl)phthalimide, and
   B. 100 mol % of a glycol component, at least 80 mol % of said glycol component being ethylene glycol.
2. Copolyesters according to claim 1 having a glass transition temperature of at least 70° C.
3. Copolyesters according to claim 1 having a glass transition temperature of at least 80° C.
4. Copolyesters according to claim 1 wherein said acid component comprises about 20–70 mol % isophthalic acid and about 80–30 mol % 4-carboxy-N-(carboxymethyl)phthalimide.
5. Sheet material comprising the copolyester according to claim 1.
6. Sheet material comprising the copolyester according to claim 3.
7. Sheet material comprising the copolyester according to claim 4.
8. A container comprising the copolyester according to claim 1.
9. A container comprising the copolyester according to claim 3.
10. A container comprising the copolyester according to claim 4.

* * * * *